US011529998B2

(12) United States Patent
Kubozono

(10) Patent No.: US 11,529,998 B2
(45) Date of Patent: Dec. 20, 2022

(54) FRONT PILLAR SUBSTRUCTURE

(71) Applicant: FUTABA INDUSTRIAL CO., LTD., Okazaki (JP)

(72) Inventor: Satoshi Kubozono, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 1 day.

(21) Appl. No.: 17/242,868

(22) Filed: Apr. 28, 2021

(65) Prior Publication Data

US 2021/0387675 A1    Dec. 16, 2021

(30) Foreign Application Priority Data

Jun. 12, 2020    (JP) .............................. JP2020-102534

(51) Int. Cl.

| B62D 25/04 | (2006.01) |
|---|---|
| B62D 27/02 | (2006.01) |
| B62D 21/15 | (2006.01) |
| B60J 5/04 | (2006.01) |
| B62D 25/02 | (2006.01) |

(52) U.S. Cl.
CPC ............ B62D 25/04 (2013.01); B60J 5/0468 (2013.01); B62D 21/152 (2013.01); B62D 25/025 (2013.01); B62D 27/023 (2013.01)

(58) Field of Classification Search
CPC ........ B62D 25/04; B62D 25/25; B62D 21/15; B62D 27/023
USPC ................................ 296/146.11, 193.06, 209
See application file for complete search history.

(56) References Cited

U.S. PATENT DOCUMENTS

| 2009/0167056 A1* | 7/2009 | Moore ................... | B62D 25/04 296/203.02 |
|---|---|---|---|
| 2015/0344071 A1 | 12/2015 | Nakano et al. | |
| 2016/0052552 A1 | 2/2016 | Yamamoto | |

FOREIGN PATENT DOCUMENTS

| JP | S61215178 A | 9/1986 | |
|---|---|---|---|
| JP | H0764278 B2 * | 7/1995 | ............. B62D 25/04 |
| JP | 2015229384 A | 12/2015 | |
| WO | 2014155539 A1 | 10/2014 | |

OTHER PUBLICATIONS

Notice of Reasons for Refusal for Japanese Patent Application No. 2020102534, dated May 10, 2022, 6 pages.

* cited by examiner

*Primary Examiner* — Dennis H Pedder
(74) *Attorney, Agent, or Firm* — Withrow & Terranova, P.L.L.C.; Vincent K. Gustafson

(57) ABSTRACT

A front pillar substructure that enables reduction in deformation of a front pillar. One embodiment of the present disclosure provides a front pillar substructure including a front pillar, and a rocker being joined to the front pillar. The front pillar includes an inner panel located inside with respect to the rocker, and an outer panel arranged so as to interpose the rocker between the inner panel and the outer panel. The outer panel includes an upper panel, and a lower panel overlapped with and joined to the upper panel, the lower panel extending downward with respect to the upper panel. The upper panel or the lower panel includes a bent section bending in the width direction when viewed from the front-rear direction, the bent section being located inside with respect to a joint region where the upper panel and the lower panel are joined.

7 Claims, 5 Drawing Sheets

FRONT PILLAR SUBSTRUCTURE

CROSS-REFERENCE TO RELATED APPLICATIONS

This application claims the benefit of Japanese Patent Application No. 2020-102534 filed on Jun. 12, 2020 with the Japan Patent Office, the entire disclosure of which is incorporated herein by reference.

BACKGROUND

The present disclosure relates to a front pillar substructure.

At the time of an offset collision or a small overlap collision where parts of a vehicle front are impacted, an excessive load from a front wheel moving rearward due to the collision is imposed on a front pillar and a rocker forming a body structure of a vehicle compartment. Deformation of the front pillar and the rocker due to the load at such small overlap collisions causes the vehicle compartment to be greatly deformed.

In order to inhibit deformation of a vehicle compartment at the time of a small overlap collision, a structure has been devised to reduce load transmission to a rocker by bending a front pillar at a joint part joined to the rocker (see International Publication No. WO2014/155539).

SUMMARY

The structure disclosed in WO2014/155539 concentrates the load at the small overlap collision on the front pillar. This leads to an increase in deformation of the front pillar, thereby failing to sufficiently reduce the deformation of the vehicle compartment.

In one aspect of the present disclosure, it is preferable to provide a front pillar substructure that enables reduction in deformation of a front pillar at the time of a small overlap collision.

One embodiment of the present disclosure provides a front pillar substructure comprising a front pillar extending in an up-down direction, and a rocker extending in a front-rear direction of a vehicle, the rocker being joined to a lower end portion of the front pillar. The front pillar comprises an inner panel located inside with respect to the rocker in the width direction of the vehicle, and an outer panel arranged so as to interpose the rocker between the inner panel and the outer panel in the width direction of the vehicle.

The outer panel comprises an upper panel, and a lower panel overlapped with and joined to the upper panel, the lower panel extending downward with respect to the upper panel. The upper panel or the lower panel comprises a bent section bending in the width direction of the vehicle when viewed from the front-rear direction of the vehicle, the bent section being located inside in the width direction of the vehicle with respect to a joint region where the upper panel and the lower panel are joined to each other.

In such configuration, not only the joint region where the upper panel and the lower panel are overlapped with each other, but also the bent section of the upper panel increases strength against an imposed load from the front pillar in the front-rear direction of the vehicle. Consequently, deformation of the front pillar can be reduced at the time of a small overlap collision.

In one embodiment of the present disclosure, a tensile strength of the lower panel may be greater than that of the upper panel. This configuration enables a load imposed on the lower panel at the time of a small overlap collision to be more easily transmitted to the rocker. This increases an effect of reducing deformation of the front pillar.

In one embodiment of the present disclosure, the lower panel may comprise an overlap portion overlapped with the rocker from below. Such configuration also enables the load imposed on the lower panel at the time of a small overlap collision to be more easily transmitted to the rocker. This increases the effect of reducing deformation of the front pillar.

In one embodiment of the present disclosure, the upper panel may not be joined to the rocker. Such configuration reduces transmission of the load from the upper panel to the rocker. This enables reduction in the bending load imposed on the rocker, thereby not only reducing deformation of the front pillar, but also avoiding breaking the rocker.

In one embodiment of the present disclosure, the front pillar may further comprise a reinforcement member joined to the inner panel and to the outer panel above the rocker. An upper end of the lower panel may be located below the reinforcement member. Such configuration makes it easier to deform an upper area above the lower panel at the time of a small overlap collision. This enables reduction in the bending load imposed on the rocker, thereby not only reducing deformation of the front pillar, but also avoiding breaking the rocker.

In one embodiment of the present disclosure, a door mounting portion may be provided in the joint region to mount a door thereon. In such configuration, the door is mounted in the joint region where the upper panel and the lower panel are overlapped with each other. This increases a rigidity of mounting the door on the front pillar.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment

[1-1. Configuration]

Figure 1:
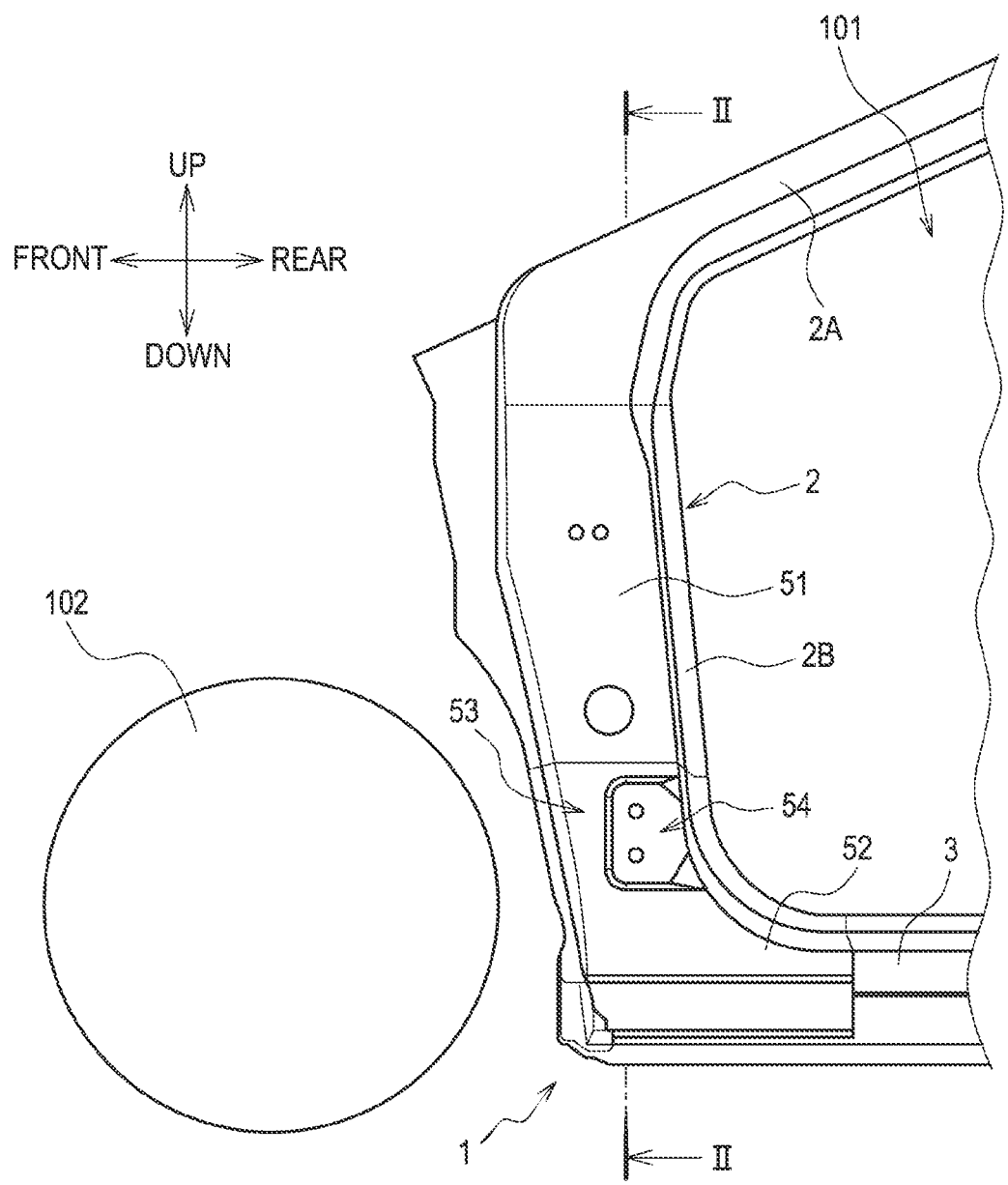
FIG. 1 is a schematic side view of a front pillar substructure of one embodiment.

A front pillar substructure 1 shown in FIG. 1 includes a front pillar 2 and a rocker 3.

The front pillar 2 and the rocker 3, together with a door, a window, and other members, define a vehicle compartment 101 of a vehicle (i.e., an automobile). Further, a front wheel 102 of the vehicle is located ahead of the front pillar substructure 1. The front pillar substructures 1 are provided one by one on both sides in a width direction of the vehicle (i.e., on a left side and a right side).

<Front Pillar>

The front pillar 2 extending in an up-down direction constitutes a front frame and an upper frame of a door opening of the vehicle.

The front pillar 2 includes an upper part (namely, a front pillar upper 2A) and a lower part (namely, a front pillar lower 2B). The front pillar upper 2A is located at an upper part of the vehicle compartment 101. The front pillar lower 2B is located between the front wheel 102 and the vehicle compartment 101.

<Rocker>

The rocker 3 extending in the front-rear direction of the vehicle constitutes a lower frame of the door opening of the vehicle. The rocker 3 is joined to a lower end portion of the front pillar 2.

<Configuration of Front Pillar>

Figure 2:
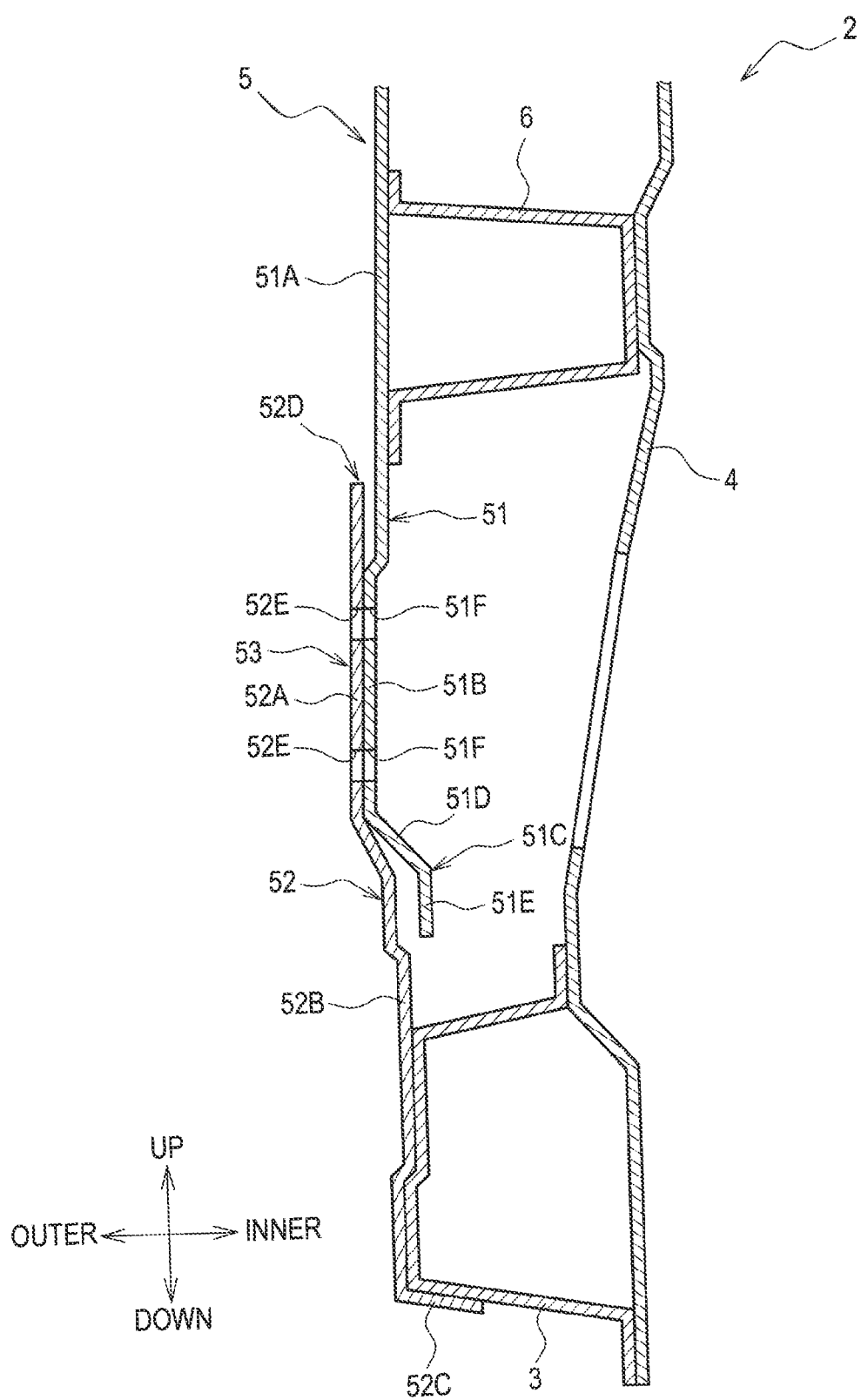
FIG. 2 is a schematic sectional view taken along line II-II in FIG. 1.

As shown in FIG. 2, the front pillar 2 includes an inner panel 4, an outer panel 5, and a reinforcement member 6.

(Inner Panel)

The inner panel 4 is located inside with respect to the rocker 3 in the width direction of the vehicle. The inner panel 4, together with the outer panel 5, constitute the front pillar lower 2B.

The inner panel 4 includes plate surfaces extending in the up-down direction of the vehicle as well as the front-rear direction thereof. A vehicle-width-direction outer surface of the inner panel 4 is joined to the reinforcement member 6 and to the rocker 3, for example, by welding.

(Outer Panel)

The outer panel 5 is arranged so as to interpose the rocker 3 between the outer panel 5 and the inner panel 4 in the width direction of the vehicle. In other words, the outer panel 5 includes a plate surface facing the inner panel 4. The outer panel 5 includes an upper panel 51 and a lower panel 52

(Upper Panel)

The upper panel 51 includes an upper portion 51A, a first joint section 51B, and a bent section 51C.

The upper portion 51A is an area located above the lower panel 52. A vehicle-width-direction inner surface of the upper portion 51A is joined to the reinforcement member 6, which will be described below, for example, by welding. The upper portion 51A is coupled to the front pillar upper 2A.

The first joint section 51B overlaps the lower panel 52 in the width direction of the vehicle. The first joint section 51B is arranged on an inner side of a second joint section 52A of the lower panel 52, which will be described below, in the width direction of the vehicle. The first joint section 51B is joined to the second joint section 52A, for example, by welding. The first joint section 51B is located below the upper portion 51A.

The bent section 51C is bent in the width direction of the vehicle when viewed from the front-rear direction of the vehicle, and is located below a joint region 53 where the upper panel 51 and the lower panel 52 are joined to each other (i.e., below the first joint section 51B) and inside with respect to the joint region 53 in the width direction of the vehicle. The bent section 51C extends in the front-rear direction of the vehicle.

Specifically, the bent section 51C includes a first extending portion 51D and a second extending portion 51E. The bent section 51C is bent so as to protrude toward an inside of the vehicle in the width direction, at a coupling area where the first extending portion 51D and the second extending portion 51E are coupled to each other.

The first extending portion 51D extends downward from a lower end of the first joint section 51B to the inside of the vehicle in the width direction (in other words, toward a direction closer to the inner panel 4). The second extending portion 51E extends downward from a lower end of the first extending portion 51D, and is curved at an angle different from the first extending portion 51D. The second extending portion 51E of the present embodiment extends substantially parallel to a vertical direction.

The bent section 51C may have a ridge-line extending in the front-rear direction of the vehicle. In other words, the bent section 51C may have a bent shape with an angle. The bent section 51C need not have a ridge-line. In other words, the bent section 51C may have a curved shape.

The bent section 51C is located above the rocker 3 in an interior of the front pillar 2. In other words, a lower end of the upper panel 51 is separated away from the rocker 3. Thus, the upper panel 51 is not joined to the rocker 3. Further, the bent section 51C is positioned away from the lower panel 52 as well as the inner panel 4.

(Lower Panel)

The lower panel 52 includes the second joint section 52A, a lower portion 52B, and an overlap portion 52C.

The second joint section 52A overlaps the upper panel 51 in the width direction of the vehicle. The second joint section 52A is arranged on an outer side of the first joint section 51B of the upper panel 51 in the width direction of the vehicle. The second joint section 52A is joined to the first joint section 51B, for example, by welding.

An upper end 52D of the lower panel 52 is located below the reinforcement member 6. Accordingly, the second joint section 52A is located below the reinforcement member 6. Further, the upper end 52D of the lower panel 52 partially overlaps the upper portion 51A of the upper panel 51 in the width direction of the vehicle.

The lower portion 52B is located below the second joint section 52A. A vehicle-width-direction inner surface of the lower portion 52B is joined to the rocker 3, for example, by welding. Further, the lower portion 52B partially overlaps the bent section 51C of the upper panel 51 in the width direction of the vehicle The overlap portion 52C is overlapped with the rocker 3 from below. The overlap portion 52C extends from a lower end of the lower portion 52B toward the inner panel 4. An upper surface of the overlap portion 52C is joined to the rocker 3, for example, by welding. The overlap portion 52C is not in contact with the inner panel 4.

A tensile strength of the lower panel 52 is greater than that of the upper panel 51. The tensile strength of the lower panel 52 is determined to be, for example, 1180 MPa, and the tensile strength of the upper panel 51 is determined to be, for example, 590 MPa.

Further, the tensile strength of the lower panel 52 is preferably equivalent to that of the rocker 3. In other words, the lower panel 52 and the rocker 3 may be made from the same material. This increases load transmission from the lower panel 52 to the rocker 3.

(Door Mounting Portion)

At the joint region 53 where the upper panel 51 and the lower panel 52 are joined to each other, a door mounting portion 54 (see FIG. 1) is provided to mount a door (not shown) of the vehicle thereon.

Figure 3:
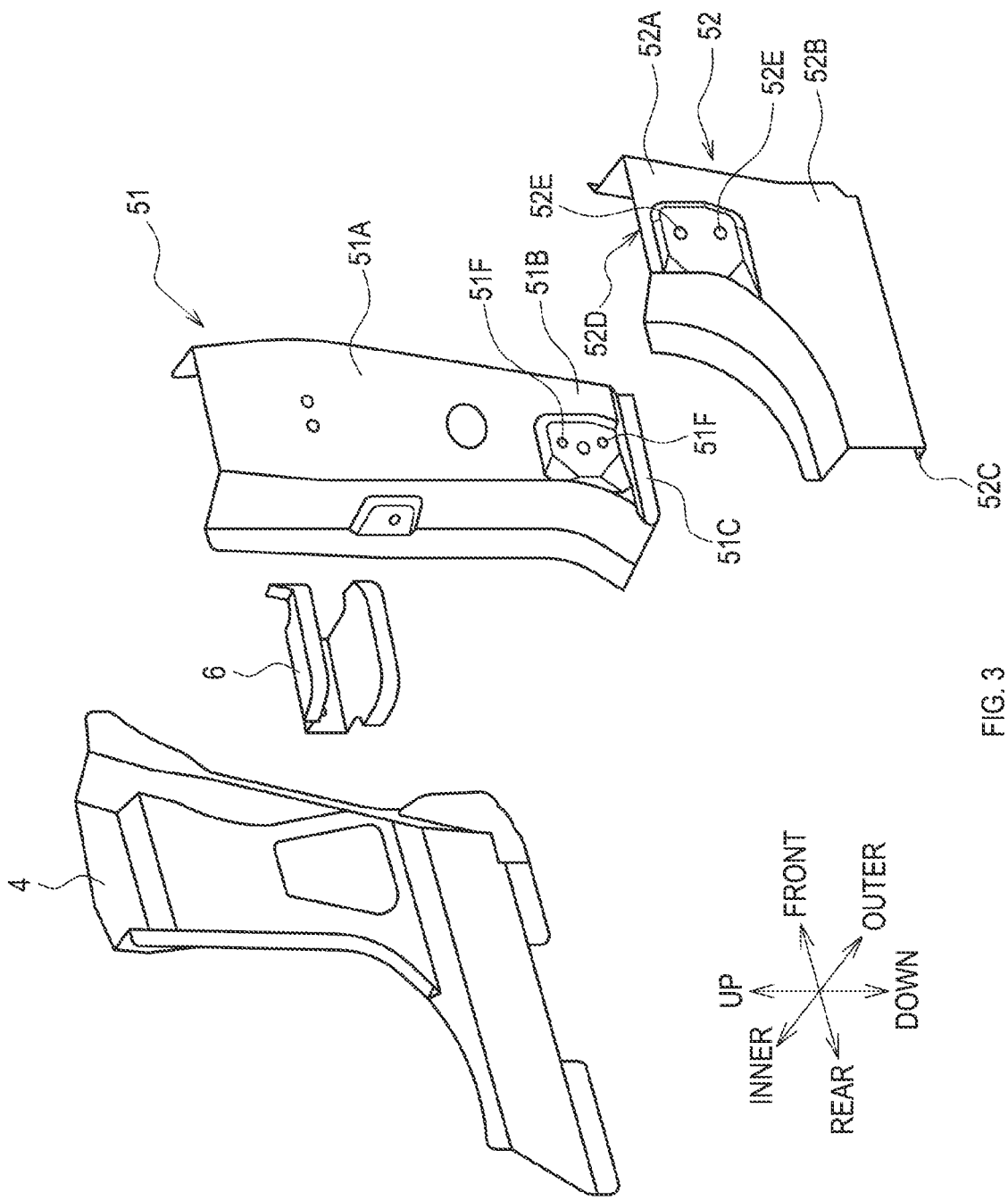
FIG. 3 is a schematic exploded perspective view of the front pillar of FIG. 1.

Specifically, as shown in FIG. 3, at least one first hole 51F for a bolt is provided in the first joint section 51B of the upper panel 51. The bolt is used for coupling a hinge of the door. Similarly, at least one second hole 52E is provided in the second joint section 52A of the lower panel 52, in which second hole 52E is overlapped with the first hole 51F.

(Reinforcement Member)

The reinforcement member 6 is a plate-shaped member that couples the inner panel 4 and the outer panel 5 to each other in the width direction of the vehicle. The reinforcement member 6 is joined to the inner panel 4 and to the outer panel 5 above the rocker 3.

[1-2. Functions]

The bent section 51C of the upper panel 51 is bent in the width direction of the vehicle. This increases a bearing capacity for load in the front-rear direction of the vehicle. Thus, the bent section 51C reduces deformation of the front pillar 2 due to load imposed by the front wheel 102.

The tensile strength of the lower panel 52 is greater than that of the upper panel 51. This enables the front pillar lower 2B to receive a greater imposed load from the front wheel 102. Further, the overlap portion 52C transmits the load to the rocker 3 from below the rocker 3. As the result, the load tends to be easily transmitted in an axial direction (i.e., in the front-rear direction of the vehicle) from the lower panel 52 to the rocker 3.

The upper panel 51 is not joined to the rocker 3, and thus the rocker 3 receives the load that is transmitted only from the lower panel 52. This reduces generation of the bending load imposed on the rocker 3.

The lower panel 52 is not aligned relative to the reinforcement member 6 in the up-down direction. This enables an upper area above the lower panel 52 (i.e., a lower area below the upper portion 51A of the upper panel 51) to be intentionally deformed, thereby to absorb the load. Thus, generation of the bending load imposed on the rocker 3 is reduced.

[1-3. Effect]

In the embodiments described above, the following effects can be obtained.

(1a) Not only the joint region 53 where the upper panel 51 and the lower panel 52 are overlapped with each other, but also the bent section 51C of the upper panel 51 increase strength against the imposed load from the front pillar 2 in the front-rear direction of the vehicle. Consequently, deformation of the front pillar 2 can be reduced at the time of a small overlap collision.

(1b) The tensile strength of the lower panel 52 is greater than that of the upper panel 51. This enables the load imposed on the lower panel 52 at the time of a small overlap collision to be more easily transmitted to the rocker 3. This increases the effect of reducing deformation of the front pillar 2.

(1c) The overlap portion 52C overlapped with the rocker 3 from below enables the load imposed on the lower panel 52 at the time of a small overlap collision to be more easily transmitted to the rocker 3. This increases the effect of reducing deformation of the front pillar 2.

(1d) The upper panel 51 is not joined to the rocker 3, thereby reducing transmission of the load from the upper panel 51 to the rocker 3. This enables reduction in the bending load imposed on the rocker 3, thereby not only reducing deformation of the front pillar 2, but also avoiding breaking the rocker 3.

(1e) The upper end 52D of the lower panel 52 is located below the reinforcement member 6, thereby making it easier to deform the upper area above the lower panel 52 at the time of a small overlap collision. This enables reduction in the bending load imposed on the rocker 3, thereby not only reducing deformation of the front pillar 2, but also avoiding breaking the rocker 3.

(1f) The door mounting portion 54 is provided in the joint region 53, and thus the door is mounted in the joint region 53 where the upper panel 51 and the lower panel 52 are overlapped with each other. This increases a rigidity of mounting the door on the front pillar 2.

2. Other Embodiments

Embodiments of the present disclosure have been described hereinabove. Nevertheless, the present disclosure is not limited to the aforementioned embodiments. The present disclosure can be embodied in various forms.

(2a) In the front pillar substructure 1 of the embodiment, the tensile strength of the lower panel 52 need not be necessarily greater than that of the upper panel 51. In other words, the tensile strength of the lower panel 52 may be equal to or smaller than that of the upper panel 51.

(2b) In the front pillar substructure 1 of the embodiment, the lower panel 52 need not necessarily include the overlap portion 52C. In other words, the lower panel 52 may be joined to the rocker 3 only in the width direction of the vehicle.

(2c) In the front pillar substructure 1 of the embodiment, the upper panel 51 may be joined to the rocker 3.

(2d) In the front pillar substructure 1 of the embodiment, the upper end 52D of the lower panel 52 may be located above the reinforcement member 6. Further, the front pillar 2 need not necessarily include the reinforcement member 6.

Figure 4:
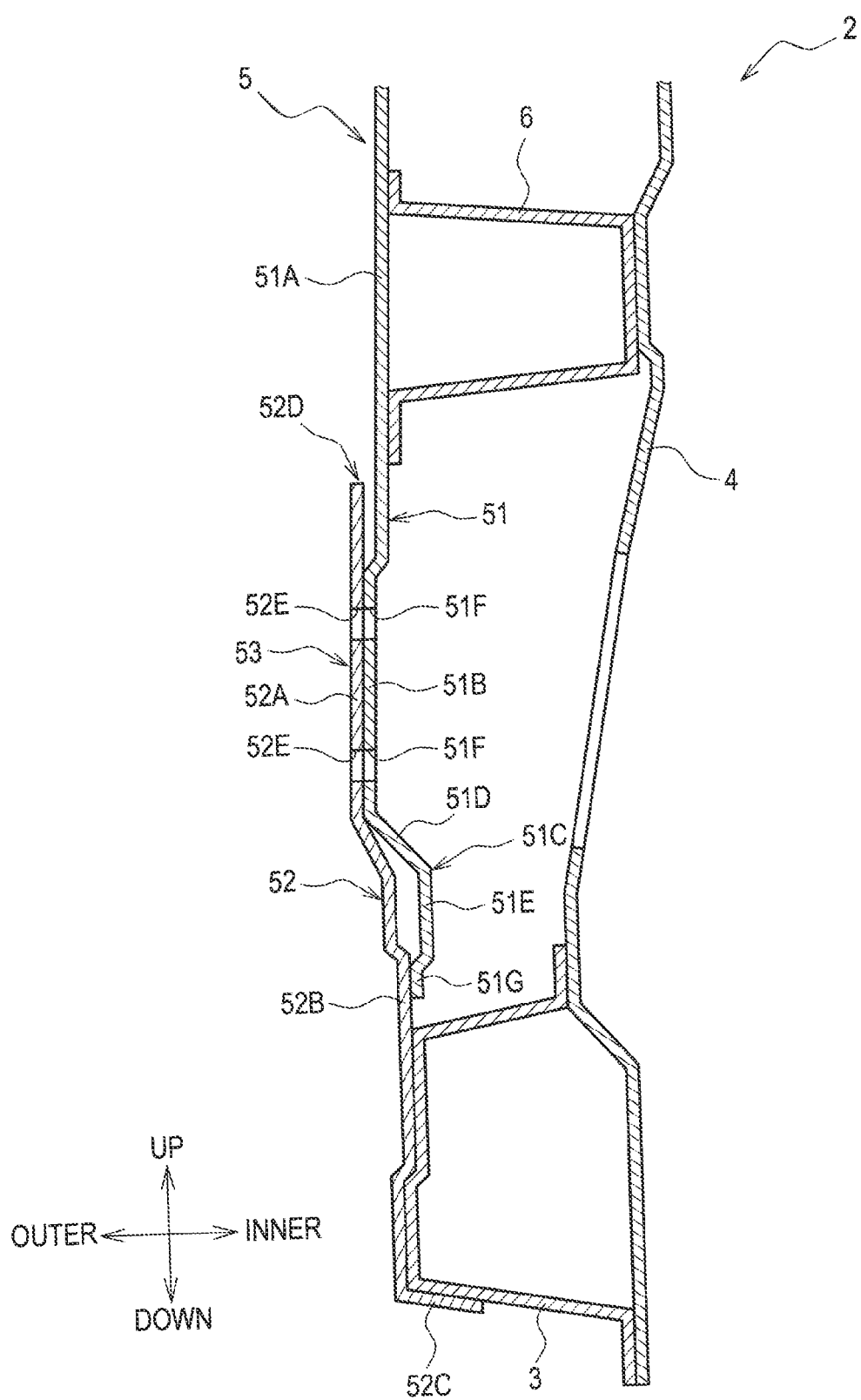
FIG. 4 is a schematic sectional view of a front pillar substructure of an embodiment different from that of FIG. 2.

(2e) In the front pillar substructure 1 of the embodiment, the bent section 51C may be joined to the lower panel 52. For example, as shown in FIG. 4, the bent section 51C may include a joint portion 51G extending downward from the second extending portion 51E and to an outside of the vehicle in the width direction. The joint portion 51G is joined to the inner surface of the lower portion 52B of the lower panel 52, for example, by welding. This increases a joint site where the upper panel 51 and the lower panel 52 are joined to each other, thereby increasing the effect of reducing deformation of the front pillar 2.

Figure 5:
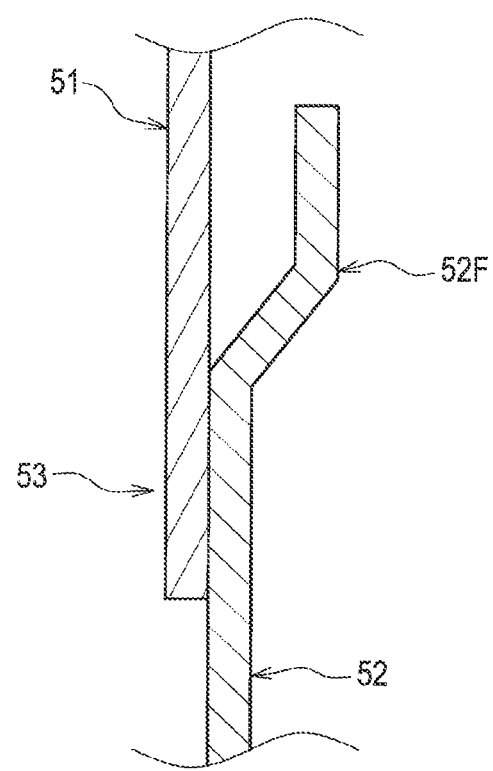
FIG. 5 is a partial schematic sectional view of a front pillar substructure of an embodiment different from those in FIG. 2 and FIG. 4.

(2f) In the front pillar substructure 1 of the embodiment, as shown in FIG. 5, the lower panel 52, instead of the upper panel 51, may include a bent section 52F. In FIG. 5, the lower panel 52 at the joint region 53 is located inside with respect to the upper panel 51 in the width direction of the vehicle. The bent section 52F provided on the lower panel 52 is bent in the direction protruding toward the inside of the vehicle in the width direction when viewed from the front-rear direction of the vehicle, and is located above the joint region 53 and inside with respect to the joint region 53 in the width direction of the vehicle.

(2g) In the front pillar substructure 1 of the aforementioned embodiment, the door mounting portion 54 (i.e., a bolt hole) is one example configuration of the door mounting portion. Further, the door mounting portion 54 may be provided in an area other than the joint region 53.

(2h) Functions of one component in the aforementioned embodiments may be distributed to two or more components. Functions of two or more components may be integrated and achieved by one component. A part of the configurations of the aforementioned embodiments may be omitted. At least a part of the configurations of aforementioned embodiments may be added to or replaced with other configurations of another one of the aforementioned embodiments. Any and all modes that are encompassed in the technical ideas identified by the languages in the claims are embodiments of the present disclosure.

What is claimed is:

1. A front pillar substructure comprising:
a front pillar extending in an up-down direction; and
a rocker extending in a front-rear direction of a vehicle, the rocker being joined to a lower end portion of the front pillar,
wherein the front pillar comprises:
an inner panel located inside with respect to the rocker in a width direction of the vehicle; and
an outer panel arranged so as to interpose the rocker between the inner panel and the outer panel in the width direction of the vehicle,
wherein the outer panel comprises:
an upper panel; and
a lower panel overlapped with and joined to the upper panel, the lower panel extending downward with respect to the upper panel,
wherein the upper panel comprises a bent section bending in the width direction of the vehicle when viewed from the front-rear direction of the vehicle, the bent section being located below a joint region where the upper panel and the lower panel are joined to each other and inside in the width direction of the vehicle with respect to the joint region.

2. The front pillar substructure according to claim 1, wherein a tensile strength of the lower panel is greater than that of the upper panel.

3. The front pillar substructure according to claim 1, wherein the lower panel comprises an overlap portion overlapped with the rocker from below.

4. The front pillar substructure according to claim 1, wherein the upper panel is not joined directly to the rocker.

5. The front pillar substructure according to claim 1, wherein the front pillar further comprises a reinforcement member joined to the inner panel and to the outer panel above the rocker, and
wherein an upper end of the lower panel is located below the reinforcement member.

6. The front pillar substructure according to claim 1, wherein a door mounting portion is provided in the joint region to mount a door thereon.

7. The front pillar substructure according to claim 1, wherein the bent section is positioned away from the inner panel.

* * * * *